UNITED STATES PATENT OFFICE.

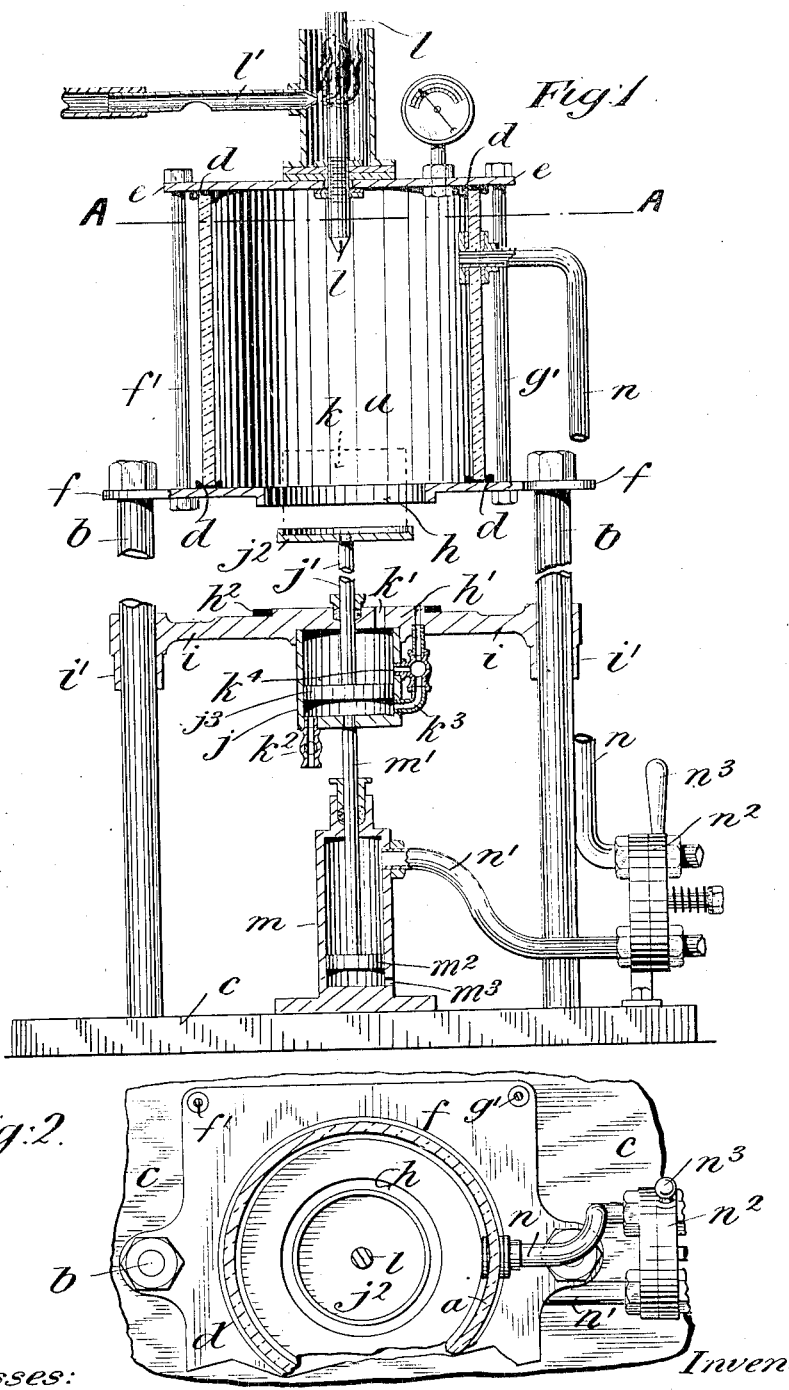

GEORGE FARQUHAR AND ROBERT NORTH, OF LONDON, ENGLAND.

DEVICE FOR HERMETICALLY SEALING METAL RECEPTACLES FOR FOOD.

No. 856,688.

Specification of Letters Patent.

Patented June 11, 1907.

Application filed October 5, 1906. Serial No. 337,522.

*To all whom it may concern:*

Be it known that we, GEORGE FARQUHAR, a subject of the King of Great Britain and Ireland, residing in London, England, and ROBERT NORTH, a subject of the King of Great Britain and Ireland, residing in London, England, have invented certain new and useful Improvements in and Relating to Devices for Hermetically Sealing Metal Receptacles for Food and the Like, of which the following is a specification.

This invention relates to improvements in and relating to devices for hermetically sealing meta receptacles for food and the like, and it has for its object to provide a device whereby the air may be exhausted from the receptacles and the air outlet in said receptacles closed by means of solder, the soldering iron being arranged in the exhausting chamber and heated in any suitable manner from the exterior thereof.

In carrying the invention into effect we employ a chamber of suitable form and construction provided with a bottom capable of being closed so as to prevent the entry of air. The closure for the bottom aforesaid is connected to the upper end of a rod attached to a piston working in a suitable cylinder. The cylinder is connected to a suitable air exhausting device as is also the chamber before referred to, a valve or cock being employed to regulate the suction of the air both from the cylinder and the chamber.

Arranged so as to be within the chamber when the same is closed is a support for the receptacle designed to be sealed, which support may comprise a grid or table mounted upon one end of a rod attached to a piston working in a cylinder secured to the closure for the chamber, said chamber being at one end in communication with the external atmosphere and at the other in communication with the exhausting chamber. The soldering is effected by means of a soldering iron passing through one wall of the chamber and so disposed that the end thereof is superposed above the opening left in the food receptacle for the extraction of the air. The iron is heated by means of a Bunsen or other burner disposed outside the chamber. An air inlet is provided to the chamber, the admission of the air being governed by means of a suitable tap or cock. A pedestal or support is provided for the chamber.

In order that the invention may be the better understood drawings are appended in which, Figure 1 is a part sectional elevation of a form of the apparatus constructed in accordance with the present invention; and Fig. 2 is a sectional plan of the exhausting chamber on line A A of Fig. 1.

Referring to the accompanying drawings, Figs. 1 and 2, $a$ indicates a cylindrical chamber supported by means of columns $b$ from a base $c$. The chamber may be formed entirely of glass a tight joint being maintained between the top $e$ and the bottom $f$ of the chamber by means of the bolts $f^1$ and $g^1$, arranged at each corner of plates $e$ and $f$. To insure an air-tight joint between the respective components of the chamber, rubber or other suitable material $d$ may be inserted between the glass and metal. The bottom of the chamber is provided with an opening $h$ for which a closure $h^1$ is provided, said closure being carried by the arms $i$ the ends of which are provided with sleeves $i^1$ which encircle the columns $b$ which thus form guides for the said closure $h^1$. A rubber or other ring $h^2$ is provided upon the upper surface of the closure so that an air-tight joint may be formed between it and the bottom of chamber $a$. Secured to the underside of closure $h^1$ is a cylinder $j$ in which is placed a piston $j^3$ attached to a rod $j^1$, to the upper end of which rod is secured the plate $j^2$ forming a support upon which is placed the vessel $k$ which it is desired to seal. The cylinder at its upper end is in communication through the opening $k^1$ with the chamber $a$, and at its opposite end it is in communication through the cock $k^2$ with the external atmosphere. A tube $k^3$ is also provided as shown in dotted lines in Fig. 1, the said tube communicating at its respective ends with the upper and lower extremities of the cylinder $j$. A cock $k^4$ is provided, the purpose of which as will be hereafter described, is to break the vacuum in chamber $a$.

$l$ indicates a soldering iron which passes through the top of the chamber $a$ and is heated from the exterior thereof by means of a Bunsen burner $l^1$. The end of the iron $l$ is so disposed that when the vessel $k$ is raised as will be presently described, the said iron comes into contact with and melts the solder closing the aperture in the said vessel $k$.

The movement of the closure $h^1$ is effected by means of a vacuum formed in a cylinder $m$ secured to the base of the apparatus and within which is disposed a suitable piston $m^2$ provided with a rod $m^1$ which at its upper end is secured to the lower end of cylinder $j$. In order to exhaust the chamber $a$ and cylinder $m$ they are respectively connected through the tubes $n$ $n^1$ with an exhaust pump or other suitable device, a valve $n^2$ being provided operable by means of the handle $n^3$ secured to the movable disk of said valve. The arrangement of the parts of the valve are such that as the handle is moved air is first of all drawn from the cylinder $m$ upon the upper side of the piston therein. The said cylinder being in communication upon the underside of the piston at $m^3$ with the atmosphere, the piston therein rises carrying with it the closure $n^1$ which is pressed firmly against the bottom of the vessel $a$. When the closing of chamber $a$ has been effected the handle $n^3$ is moved again and air is drawn from the said chamber $a$. The vacuum in cylinder $j$ is created upon the exhaustion of chamber $a$, with which the upper end of the said cylinder is in communication as aforesaid. The vessel $k$ is kept in contact with the iron $l$ until the solder flows over the opening, when the valve $n^2$ is operated to disconnect the pump or the like and air is admitted to the cylinder $j$ through cock $k^2$ and thence by tube $k^3$ to chamber $a$ causing the piston in the cylinder $j$ to fall and remove the vessel $k$ out of contact with the soldering iron $l$ and permitting the solder to set. The further movement of the air valve $n^2$ will then admit air to the cylinder $m$ and the closure is withdrawn from the vessel $a$.

We find in practice that it is advantageous where a pump is employed to extract air from the vessel $a$ that a non-return valve be inserted in the connection between said pump and the apparatus as otherwise the fluctuations in the chamber cause the solder when in a fluid state to be agitated so that it is sometimes difficult to get it always to flow and close the aperture in the head of the vessel.

Having described our invention we claim:

1. In a soldering apparatus, the combination of a receptacle having a soldering tool depending from its top and having an opening in its bottom, a closure supported to reciprocate to and from said opening whereby the opening can be closed, means for supporting the vessel to be soldered on said closure, a cylinder, a piston in said cylinder, a rod connecting the piston with said closure, a conduit leading to said cylinder, a valve member connected with the conduit, a conduit connecting the valve member with said receptacle, said valve member being arranged to connect the said piston with a suction device whereby the cylinder is exhausted to cause the piston to raise the closure to close the receptacle, said valve being also arranged to connect the conduit and receptacle with the suction device whereby the air in the receptacle is exhausted.

2. In a soldering apparatus, the combination of a receptacle having a soldering tool depending from its top and having an opening in its bottom, a closure supported to reciprocate to and from said opening whereby the opening can be closed, means for supporting the vessel to be soldered on said closure, a cylinder, a piston in said cylinder, a rod connecting the piston with said closure, a conduit leading to said cylinder, a valve member connected with the conduit, a conduit connecting the valve member with said receptacle, said valve member being arranged to connect the said piston with a suction device whereby the cylinder is exhausted to cause the piston to raise the closure to close the receptacle, said valve being also arranged to connect the conduit and receptacle with the suction device whereby the air in the receptacle is exhausted, and means located externally of said receptacle for heating the soldering tool that projects downward into the receptacle.

3. In a soldering apparatus, the combination of a receptacle, a soldering tool projecting through the top into the receptacle, the receptacle having an opening in its bottom, a reciprocatable closure arranged to close the opening in the bottom of the receptacle, a cylinder projecting downward from said closure, a passage connecting the upper and lower portions of the cylinder, a piston in said cylinder, a rod connected with said piston and projecting through the closure, a support on said rod for the article to be soldered, an aperture in said closure leading into said cylinder, an outlet at the lower part of the cylinder controlled by a cock, a second cylinder supported on the base, a piston in the latter cylinder, a rod connected with the latter piston and secured to the closure member whereby the latter is reciprocated by the piston, a valve member, a conduit leading from the said receptacle to the valve member, and a conduit leading from the second cylinder above the piston to the valve member, the second cylinder having an outlet at its lower portion below the piston.

4. In a soldering apparatus, the combination of a receptacle having an opening therein for admitting the article to be soldered, a closure movable to and from said opening, and vacuum controlled means for moving the closure to and from said opening.

5. In a soldering apparatus, the combination of a receptacle having an opening therein for admitting the article to be soldered, a closure movable to and from said opening, vacuum controlled means for moving the closure to and from said opening, a valve member arranged to control the vacuum device, a conduit connecting the valve member with the receptacle, the valve device being also arranged when shifted to another position to exhaust the receptacle.

6. In a soldering apparatus, the combination of a receptacle having an opening therein for admitting the article to be soldered, a closure movable to and from said opening, and vacuum controlled means for moving the closure to and from said opening, and pressure operated means for shifting the article in the receptacle on withdrawal of the air therein to bring the article to engage the soldering means.

Signed this 17th day of September, 1906 in the presence of the two undermentioned witnesses.

GEORGE FARQUHAR.
ROBERT NORTH.

Witnesses:
 JOHN H. JACK,
 E. H. HARBERT.